United States Patent [19]

Zehner et al.

[11] Patent Number: 4,866,518

[45] Date of Patent: Sep. 12, 1989

[54] ARRANGEMENT FOR DPCM CODING OF TELEVISION SIGNALS WITH FAST SIGNAL PROCESSING

[75] Inventors: Bernd Zehner; Fred Matthiesen, both of Munich; Matthias Schoebinger, Frankfurt am Main; Ulrich Totzek, Munich, all of Fed. Rep. of Germany

[73] Assignee: Siemens Aktiengesellschaft, Berlin and Munich, Fed. Rep. of Germany

[21] Appl. No.: 176,326

[22] Filed: Mar. 31, 1988

[30] Foreign Application Priority Data

Apr. 27, 1987 [DE] Fed. Rep. of Germany ....... 3713984

[51] Int. Cl.$^4$ ............................................. H04N 7/13
[52] U.S. Cl. ....................................... 358/135; 358/136
[58] Field of Search ................... 358/136, 135, 12, 13, 358/133; 325/122, 27

[56] References Cited

U.S. PATENT DOCUMENTS 4,627,480  6/1987  Kuroda et al. ...................... 358/136
4,636,856  1/1987  Starck .................................. 358/135
4,689,671  8/1987  Ohki et al. ......................... 358/136 X

OTHER PUBLICATIONS

Pirsch, "Design of a DPCM Codec for VLSI Realization in CMOS", 73 Proc. IEEE, 592, 592-98 (1984).

*Primary Examiner*—James J. Groody
*Assistant Examiner*—Victor R. Kostak
*Attorney, Agent, or Firm*—Hill, Van Santen, Steadman & Simpson

[57] ABSTRACT

In DPCM coders, respective estimated values are subtracted from digitized picture element signals and the estimated errors are employed for signal transmission following quantization and coding. Each estimated error is quantized with a fictitious, positive operational sign in a first programmable logic arrangement and, parallel thereto, is quantized with a fictitious negative operational sign in a second programmable logic arrangement. Of these two quantizing results, the correct result is selected via a multiplexer controlled by the actual operational sign of the estimated error.

5 Claims, 2 Drawing Sheets

ARRANGEMENT FOR DPCM CODING OF TELEVISION SIGNALS WITH FAST SIGNAL PROCESSING

BACKGROUND OF THE INVENTION

Field of the Invention:

The present invention relates to an arrangement for difference pulse code modulation (DPCM) coding of television signals, in which respective estimated values are subtracted from digitized picture element signals and the difference signals obtained are utilized for signal transmission following quantization and coding, and comprising a recursive signal path that, in turn, comprises a first adder for forming reconstructive picture element signals from the quantized difference signals and the estimated values, and comprises a limiter, a predictor for forming the estimated values and a subtractor for forming the difference signals.

Description of the Prior Art

An arrangement of the type set forth above is generally known from the publication Proc. IEEE, vol. 73, No. 4, Apr. 1985, pp. 592–598, particularly FIGS. 1, 2 and 4, and will be explained here with reference to a basic circuit diagram as shown in FIG. 1 of the present application. A sequence of digitized picture element signals s is received at an input 1 of the arrangement, the picture element signals s being supplied via sample and hold stages that are not illustrated. In order to reduce the data flow, efforts have been undertaken to remove redundant and irrelevant portions of the video signal in order, for example, to reduce the bit transmission rate without thereby deteriorating the picture quality. In detail, this occurs in that it is not the successive picture element signals that are transmitted via the transmission channel to a receiver, but only the difference signals that are formed by forming the difference between a respective current picture element signal s and an estimated value s identified in a predictor on the basis of the preceding picture element signals. Such a method is also referred to as difference pulse code modulation (DPCM).

The difference formation required for a DPCM coding is carried out in a subtractor 2 whose first input is connected to the input 1 and whose second input is connected to a predictor 3. Each difference signal $\Delta$ that is also referred to as an estimated error is quantized in a quantizer 4, whereby the difference signal $\Delta_q = \Delta + q$ that occurs and is affected by the quantizing error q, is coded in a coder 5 and is supplied to a transmission channel by way of an output 6. A recursive signal path that extends from the circuit point 7 at the output of the quantizer 4 contains a first adder 8, a limiter 9 and a predictor 3, and is connected to the second input of the subtractor 2 for forming the estimated value The output of the predictor 3 is further connected to a second input of the first adder 8 that forms what is referred to as a reconstructed picture element signal $s_R$ by addition of the quantized difference signal $\Delta_q$ and the estimated value The predictor 3 supplies the estimated value s from at least one of the preceding picture element signals for every current picture element signal s.

When, according to FIG. 2, the current picture element lying in the line n in a television picture is referenced X, the picture element sampled immediately therebefore is referenced A, the picture element of the preceding line n−1 corresponding to X is referenced C and the picture elements aligned adjacent the latter and sampled immediately before or, respectively, after the element C are referenced B and D. When the corresponding picture elements of the preceding picture m−1 are referenced X' and A'–D', then the following occurs. For forming the estimated value s for the picture element signal of the picture element X, the picture element signals of at least one of the points A–D are utilized, whereby one speaks of a 2-dimensional (2D) prediction. When, in addition thereto or exclusively therefrom, the picture element signals of at least one of the picture elements X' and A'–D' are used, then a 3-dimensional (3D) prediction is present. In the former case, the estimated value s can be identified, for example, according to the 2D-estimating equation $$s = \alpha s_A + \beta s_B + \gamma s_C + \delta s_D \quad (1)$$

and in the latter case can be estimated, for example, according to the 3D-estimating equation $$s = s_{X'} \quad (2)$$

wherein $s_A$ is the reconstructed picture element signal of the picture element A, $s_B$ is the reconstructed picture element signal of the picture element B, etc, and wherein the coefficients $\alpha$, $\beta$, $\gamma$ and $\delta$ represent weighting factors that are assigned to the individual picture element signals. The estimated equation (2) is recommended when the contrast of the current picture element X to the picture elements surrounding the picture element X is low, this being referred to as "activity".

SUMMARY OF THE INVENTION

The object of the present invention is to provide an arrangement of the type set forth above in which a fast signal processing is guaranteed.

The above object is achieved, according to the present invention, in an arrangement for DPCM coding of television signals in which respective estimated values are subtracted from digitized picture element signals and the difference signals obtained are utilized for signal transmission following quantization and coding, and which comprises a recursive signal path that, in turn, includes a first adder for forming reconstructed picture element signals from the quantized difference signals and the estimated values, a limiter, a predictor for forming the estimated values, and a subtractor for forming the difference signals. The arrangement is particularly characterized in that the quantizer is constructed of two programmable logic arrangements, in that the input lines of the AND stages of both logic arrangements are connected to the output lines of the subtractor, with the exception of the output line carrying the operational sign bit, in that the output lines of the OR stages of both logic arrangements are connected to the inputs of a multiplexer, in that that output line of the subtractor carrying the operational sign bit is connected to the input of an operational sign control whose output is connected to a control input of the multiplexer, and in that, dependent on the operational sign bit present on the one output line of the subtractor, either the output lines of the OR stage of the one logic arrangement or the output lines of the OR stage of the other logic arrangement are connected through to the output of the multiplexer.

The advantage obtainable in practicing the present invention is, in particular, the reduced quantizing running times that occur in the formation of the quantized difference signals $\Delta_q$. The present invention is therefore suitable both for utilization in a 2-D estimating and coding method and in a 3-D estimating and coding method. It can be realized in a relatively simple manner in integrated circuit technology on a semiconductor body.

A particular feature of the invention is characterized in that the first input of the subtractor receives the digitized picture element signals, in that the output of the quantizer is connected to the first input of the first adder, in that the output of the first adder is connected to the input of the predictor whose output is connected both to the second input of the subtractor and to the second input of the first adder, and in that the output of the quantizer is connected to the input of a coder whose output forms the output of the arrangement.

Another feature of the invention is particularly characterized in that the output of the predictor is formed of the output of a second adder whose first input is connected to the output of the first adder and whose second input is connected to the output of the first adder via a series circuit composed of a plurality of time-delay elements and a plurality of further adders, whereby each of the further adders is charged via one of its inputs with time-delay picture element signals that can be taken at the output of the time-delay elements.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
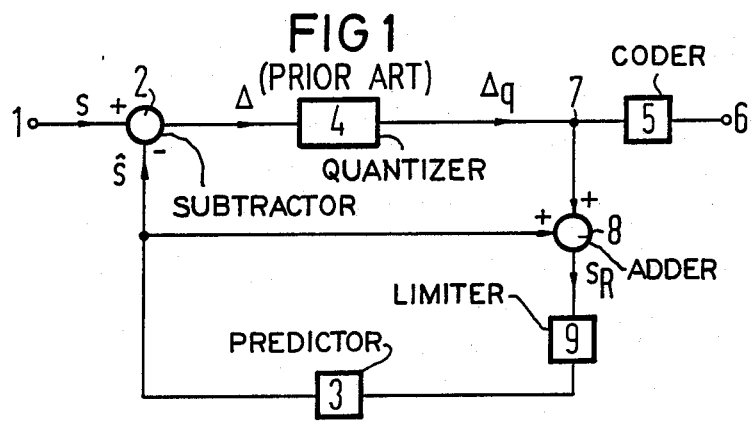
FIG. 1 is a basic circuit diagram of a known arrangement for DPCM coding.
Figure 2:
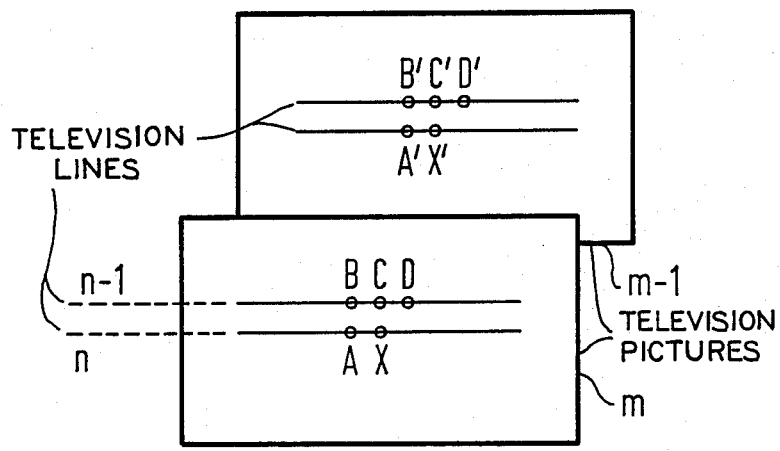
FIG. 2 is a schematic illustration of individual picture elements of two successive television pictures for explaining the operation of FIG. 1.
Figure 3:
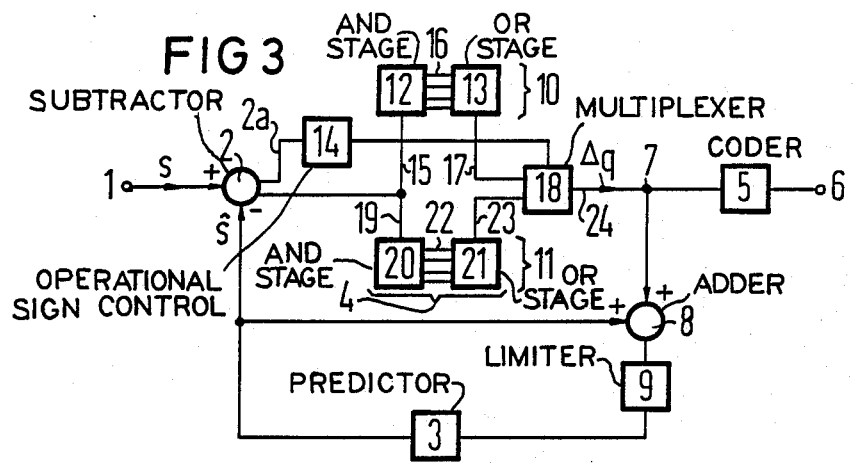
FIG. 3 is a schematic representation of a first exemplary embodiment of the invention.

FIG. 3 illustrates an arrangement constructed in accordance with the invention that departs on the basis of the fundamental structure of a DPCM coder shown in FIG. 1. The circuit elements already set forth with reference to FIG. 1 are thereby provided with the same reference characters in FIG. 3. The quantizer 4 is essentially composed of two programmable logic arrangements (PLAs) 10 and 11, of which the first contains an AND stage 12 and a OR stage 13. Given a two's complement representation of the digital signals, the bit indicating the operational sign is transmitted on a first line 2a of the nine lines extending from the output of the subtractor 2 given a word width of 9 bits, these bits indicating the operational sign being supplied to a control device 14, whereas the remaining eight lines are connected to eight input lines 15 that are assigned to the AND stage 12 of the logic arrangement 10. Product term lines are referenced 16 and connect the OR stage 13 to the AND stage 12. Nine output lines that are referenced 17 are thereby assigned to the OR stage 13. These are connected to the upper nine inputs of a multiplexer 18. The programmable logic arrangement 11 is identically constructed. It comprises eight input lines 19 that are likewise connected to the eight output lines of the subtractor 2. The AND stage 20 is connected to the OR stage 21 via product term lines 22. The OR stage 21 has nine output lines 23 assigned thereto that are connected to the lower nine inputs of the multiplexer 18. The nine output lines of the multiplexer 18 are referenced 24 and lead to the input of a coder 5 and to the first input of the adder 8. The multiplexer 18 is driven, proceeding from the output of the control device 14, such that either the output lines 17 of the logic arrangement 10 or the output lines 23 of the logic arrangement 11 are connected through to the output lines 24.

The processing of the data supplied to the logic arrangement 10 is then undertaken such that all difference signals output by the subtractor 2 that proceed via the input lines 15 to the AND stage 12 and whose absolute amounts lie within a prescribed value range are converted into a positive signal value that is specific to this value range this positive signal value being available on the output lines 17. The difference signal supplied to the logic arrangement 10 are thereby processed in that logic arrangement as though they respectively had a positive operational sign, regardless of their actual operational sign. A plurality of positive, specific signal values that is the same as the plurality of such values ranges resides on the output lines 17. Since these signal values are always positive, that output line among the output lines 17 by wa of which the operational sign that is transmitted is permanently occupied with a logical "0".

All difference signals output by the subtractor 2 that proceed to the AND stage 20 of the logic arrangement 11 via the input lines 19 and whose absolute amounts lie within a prescribed value range, on the other hand are converted into a negative signal value specific to this value range, being converted and present on the output lines 23. The difference signals supplied to the logic arrangement 11 are therefore processed therein as though they respectively comprised a negative operational sign, regardless of their actual operational sign. A plurality of negative, specific signal values identical in number to the plurality of the latter value ranges resides on the output lines 23. Since the signal values output via the output lines 23 are always negative, that line among the lines 23 that transmits the operational sign bit is permanently occupied with the logical When a signal value is output from the output of the subtractor 2, then it is supplied both to the logic arrangement 10 by way of the input lines 15 and to the logic arrangement 11 by way of the lines 19 and is processed in both logic arrangements, whereby the processing in the arrangement 10 is based on a positive operational sign and the processing in the arrangement 11 is based on a negative operational sign. The actual operational sign of the difference sign output by the subtractor 2 is then taken into consideration in that the multiplexer is enabled via the control device 14 to through-connect the output line 17 onto the output lines 24 of the multiplexer in case of the positive operational sign and to through-connect the output lines 23 to the output lines 24 of the multiplexer in the case of the negative operational sign. The simultaneous processing of the difference signal output by the subtractor 2 in both logic arrangements 10 and 11 with respectively, fictitious operational signs and the selection of the correct result with the assistance of the multiplexer 18 leads to a significant shortening at the quantizing running time since the logic arrangements need be driven only by way of eight input lines and the ninth input line required in and of itself is directly used for controlling the multiplexer 18. The processing of the difference signals in the logic arrangements 10 and 11 set forth above amounts to the fact that the positive branch of the quantizer characteristic is implemented in the logic arrangement 10 and the negative branch of the quantizer characteristic is implemented in the logic arrangement 11.

Figure 4:
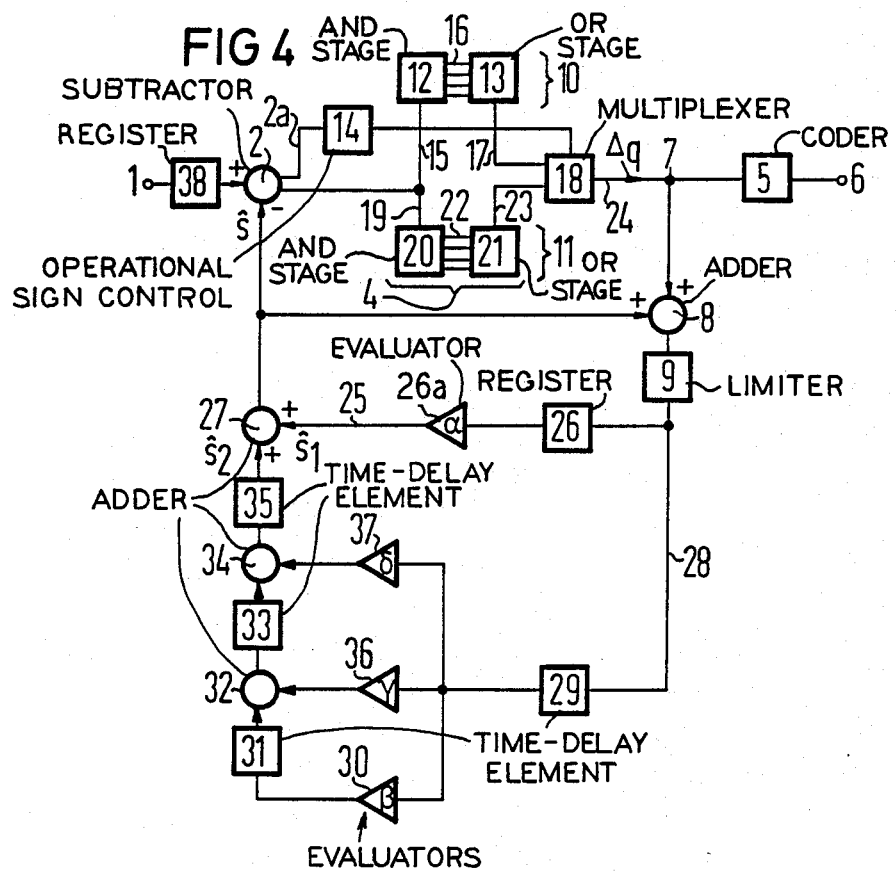
FIG. 4 is a schematic representation of a second exemplary embodiment of the invention.

FIG. 4 illustrates a 2D DPCM coder constructed in accordance with the present invention that differs from that of FIG. 3 essentially on the basis of a specific structure of the predictor 3. Since the predictor 3 in FIG. 4 works on the basis of a 2D-estimating equation corresponding to the equation (1), it comprises a first circuit branch 25 that extends from the output of the limiter 9 to the first input of an adder 27 via a register 26 charged with a clock pulse voltage and via an evaluator 26a that executes a signal weighting with a weighting factor $\alpha$, the output of the adder 27 being connected to the second input of the subtractor 2 and to the second input of the adder 8. By way of the circuit branch 25, the first input of the adder 27 is supplied with a signal component $s_1$ of the estimated values s that is acquired with the assistance of the picture element A. A second circuit branch 28 extends from the output of the limiter 9 to the second input of the adder 27 and serves the purpose of deriving a second signal component acquired with the assistance of the picture elements B, C and D. The signal component $s_2$ is thereby composed of a plurality of components of which the first is derived via a first time-delay element 29, an evaluator 30 that executes a weighting based on the factor $\beta$, and by way of an iterative circuit of a time delay element 31, an adder 32, a time-delay element 33, an adder 34 and a time-delay element 35.

When it is assumed that the time-delay element 29 produces a time delay that corresponds to the expression (z-2). T, where z indicates the plurality of picture elements per television line and T denotes a clock pulse period duration, and when it is further assumed that the time-delay elements 31, 33 and 35, preferably constructed as clocked registers, each delay by a clock pulse period duration T, then it can be seen that the first component of the signal component $s_2$ derives from the picture element B. A second component that is taken from the output of the time-delay element 29 via an evaluator 36 weighting with the factor $\gamma$ and is supplied to an input of the adder 32 expresses the dependency of the signal component $s_2$ on the picture element C, whereas the third component derived from the output of the time-delay element 29 by way of an evaluator 37 (factor $\delta$) expresses the influence of the picture element D. The estimated value s is then additively composed of the two signal components $s_1$ and $s_2$.

A further register 38, charged with the clock pulse voltage, is arranged in series with the input 1. At the beginning of a clock pulse period i, it is assumed that a current picture element signal s is stored in the register 38, the picture element signal s, for example, corresponding to the picture element X, and is assumed that a reconstructed picture element signal of the picture element A sampled immediately before is stored in the register 26. In the course of the clock pulse period under consideration, the latter, following previous weighting with the factor $\alpha$, is added in the adder 27 to the signal component $s_2$ transmitted via the circuit elements 29-35 and the result of the addition is then subtracted from the current picture element signal s in the subtractor 2. After quantization, in the quantizer 4, of the difference signal obtained in this manner, the quantized difference signal $\Delta_q$ is added to the estimated value s in the adder 8 and the addition result limited in the limiter 9 that represents a reconstructed picture element signal of the picture element X is supplied to the input of the register 26. At the beginning of the next successive clock pulse period i+1, this latter signal is then stored in the register 26 and the register 38 simultaneously offers the next-successive current picture element signal s for a corresponding processing.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an arrangement for DPCM coding of television signals, in which respective estimated value signals are subtracted from digitized picture element signals to produce difference signals and the difference signals obtained are utilized for signals transmission allowing quantization and coding, said arrangement having a quantizer which generates quantized difference signals from said difference signals and is followed by a recursive signal path, said recursive signal path including an adder connected to the output of said quantizer for forming reconstructed picture element signals from the quantized difference signals and from the estimated value signals, and a limiter connected to the output of said adder, the improvement comprising:

predictor means accepting the output of said adder for generating estimated value signals;

subtractor means accepting said digitized picture element signals and said estimated value signals for generating said difference signals and an operational sign signal;

a first programmable logic means accepting said difference signals for generating signal values indicative of a positive output operational value from said subtractor at the output of said first programmable logic means;

a second programmable logic means accepting said difference signals for generating signal values indicative of a negative output operational value from said subtractor means at the output of said second programmable logic means;

multiplexer means having a first input accepting the output of said first programmable logic means, a second input accepting the output of said second programmable logic means, and a third input accepting said operational sign signal, for selectively through-connecting to the output of said multiplexer means either the output of said first programmable logic means or the output of said second programmable logic means in response to said operational sign signal.

2. The improvement of claim 1, and further comprising:

a coder means connected to said output of said multiplexer means for coding and forming the output of said arrangement for connection to a transmission channel.

3. The improvement of claim 1, wherein said predictor means is a 2-D predictor, said 2-D predictor comprising: a first circuit branch having,
register means accepting an input signal from said limiter for generating a registered output signal, and
evaluator means accepting said registered output signal for producing a weighted signal output corresponding to said registered output signal; and
a second circuit branch having,
time delay means accepting an input signal from the limiter for delaying said input signal for a period of time corresponding to the occurrence of (z-2) digitized picture element signals, z being equal to the number of digitized picture elements per scan line, thereby to form a delayed output signal;
a plurality of evaluator means each accepting said delayed output signal for producing a weighted signal output corresponding to the output of said time delay means,
adder/delay means accepting said weighted signal outputs from said evaluator means and said plurality of evaluator means, for delaying and additively combining said weighted signal outputs to generate said estimated value signals.

4. The improved arrangement of claim 3, wherein said adder/delay means comprises an alternatingly arranged series of adders and time delay elements, each of said adders having a first input accepting an output from a respective previously occurring time delay element in said alternatingly arranged series and a second input accepting an output of a respective evaluator means.

5. The improved arrangement of claim 1, wherein each of said first and second programmable logic means comprises:
an AND stage accepting said difference signals from said subtractor means; and
an OR stage accepting input signals from said AND stage and forming at the output thereof the signal values of the respective programmable logic means.

* * * * *